Nov. 25, 1947.  G. DURST  2,431,611

COMPOSITE METAL SOLDER

Filed March 9, 1944

George Durst
Inventor
Haynes and Koenig
Attorneys

Patented Nov. 25, 1947

2,431,611

UNITED STATES PATENT OFFICE 2,431,611

COMPOSITE METAL SOLDER

George Durst, Attleboro, Mass., assignor to Metals & Controls Corporation, Attleboro, Mass., a corporation of Massachusetts Application March 9, 1944, Serial No. 525,683
In Canada March 27, 1943

8 Claims. (Cl. 113—110)

This invention relates to solders, and more particularly to composite metal solders for brazing.

This application is a continuation-in-part of my copending application, Serial No. 437,659, filed April 4, 1942, now Patent 2,362,893.

Among the several objects of this invention are the provision of a solder which has a relatively low melting point, yet which is ductile, and easily cold-worked in its prepared form; the provision of a silver solder of the above type in solid form particularly for brazing which has high ductility and elongation before use; the provision of a silver brazing solder having relatively great tensile strength after fusion and said relatively low melting point and high ductility before use; and the provision of a solder of the class indicated which is in wire, sheet or tube form and which can be easily made by readily available means. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

In the accompanying drawing, in which are illustrated several of various possible embodiments of the invention, Fig. 1 is a sectional view of one embodiment of the invention;

Similar reference characters indicate corresponding parts throughout the several views of the drawing.

In the art of soldering two qualities of the solder which have been recognized as desirable are low melting point, and high tensile strength after a soldered joint has been formed therefrom. Solders have in general been divided into two classes designated respectively as (1) soft solders, or solders having a melting point of the order of 300 to 500° F., and (2) silver solders, having a melting point of the order of 1200 to 1500° F. The soft solders in general form a soldered joint having relatively low tensile strength. The silver solders have a high tensile strength and are employed for brazing, where such strength is desired. Attempts have been made to prepare a solder which has a relatively low melting point, yet forms a joint having a relatively high tensile strength. Such attempts have been relatively unsuccessful. The process of manufacture is difficult and the solders obtained are brittle to the degree that it is substantially impossible to form them into a wire, sheet or tube form, for commercial use. For this reason solders which have a low melting point, and which form a joint with a high tensile strength have been little used.

According to the present invention a solder is formed which in its manufactured form is ductile and easily cold-worked so that it presents no manufacturing difficulties, yet has the desirable characteristics of relatively low melting point and the property of forming a joint with a high tensile strength.

According to the present invention the solder is in the form of a composite metal. Such a composite metal is formed of two or more metal or alloy constituents.

Figure 1:
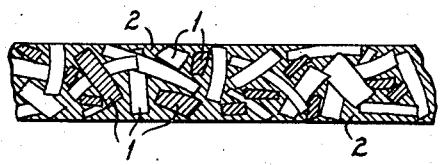

The invention will first be described as embodied in a composite metal formed from two different kinds of metals or alloys. Referring now to Fig. 1, a composite metal solder is illustrated in which particles 1 are of fine silver, a silver alloy or silver solder and component 2 is tin. Relatively short pieces of the silver alloy (or fine silver) in wire form have been placed in a mold and the mold then filled with molten tin. In the resulting product the particles of silver alloy are, as shown, embedded in the tin 2. The particles are preferably compressed to the proper density of packing before the molten tin is added so that the proper proportion of tin will be incorporated. The finished ingot, slab or other form in which the composite metal is obtained may then be rolled down to any desired thickness.

Figure 2:
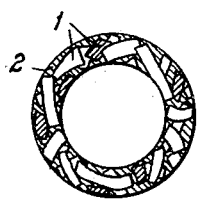
Fig. 2 is a section of an alternative embodiment.

Fig. 2 illustrates the composite metal formed as a tube. Here likewise the particles of fine silver 1 are embedded in a matrix of tin 2.

Figure 3:
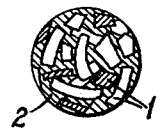
Fig. 3 is a section of another form of the invention.

Fig. 3 illustrates a rod likewise formed of particles of silver embedded in tin.

Figure 4:
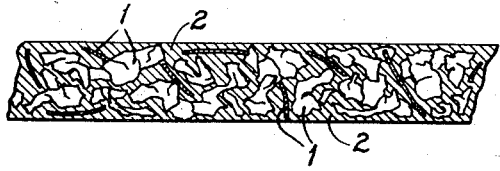
Fig. 4 is a section of a different form.

Instead of small pieces of wire, small pieces of thin foil may be substituted. Fig. 4 illustrates this embodiment. The small pieces of thin silver foil 1 are shown embedded in a mass of tin 2.

The particles need not be of any particular size or shape provided the particles of the higher melting constituent do not substantially exceed .005 of an inch in thickness in the final composite metal product and are not so small as to be dissolved by the liquid tin during the manufacture of the solder.

The high-melting-point silver constituent of the composite solder referred to is fine silver, or silver solder which has for example the following composition by weight:

|  | Per cent |
|---|---|
| Silver | 40 to 80 |
| Copper | 0 to 30 |
| Zinc | 5 to 25 |
| Cadmium | 5 to 25 |
| Tin | 0 to 10 |

The low-melting-point tin constituent may be either pure tin or an alloy which has a composition within the following range:

|  | Per cent |
|---|---|
| Tin | 0 to 100 |
| Antimony | 0 to 15 |
| Cadmium | 0 to 100 |
| Lead | 0 to 10 |
| Bismuth | 0 to 10 |
| Zinc | 0 to 50 |

It has been found that the composite metal solders of the present invention will at the moment of using mutually dissolve and will fuse together into an alloy at a relatively low temperature of the order of about 1000° F. The resulting alloy has a high tensile strength but relatively little elongation.

In the following examples, which illustrate the invention, all parts are by weight.

*Example 1*

A composite metal solder is made from an alloy of 500 parts of silver, 155 parts of copper, 165 parts of zinc and 80 parts of cadmium, and tin. The tin comprises approximately 25% of the weight of the completed composite metal. This solder melts at 850 to 1000° F.

*Example 2*

A composite metal solder is formed from 605 parts of silver, 225 parts of copper, 70 parts of zinc and 100 parts of cadmium, and tin. The tin in the resulting composite metal amounted to 19 to 21% by weight. The composite metal flows at 900 to 920° F. when rolled until the silver alloy layer is approximately .001 to .0012 of an inch in thickness.

The following table illustrates the effect of varying the proportion of tin. The silver alloy of Example 1 was used.

| Tin contents by weight | Flowing range |
|---|---|
|  | ° F. |
| 35% | 780–800 |
| 25% | 880–900 |
| 15% | 940–960 |
| 10% | 1,000–1,020 |

In lieu of the tin constituent of the composite metal, an alloy of 80 parts of cadmium and 20 parts of zinc; or one of 35 parts of cadmium, 35 parts of zinc, and 30 parts of tin; or one of 49 parts of zinc, 50 parts of cadmium, and one part of an alkali metal may be substituted.

The relatively lower melting tin, cadmium or zinc alloy may in any instance be coated with the silver or silver alloy if desired.

The brazing operation utilizing the solders of the present invention is preferably carried out with relatively low-melting fluxes. Two examples of such fluxes are as follows (all parts are by weight):

|  | Parts |
|---|---|
| Potassium chloride | 32 |
| Sodium chloride | 12 |
| Potassium acid fluoride | 6 |
| Lithium chloride | 20 |
| Cadmium chloride | 30 | or

|  | Parts |
|---|---|
| Potassium acid fluoride | 30 |
| Borax | 70 |

The latter mixture is preferably treated with hydrogen peroxide. The former mixture is crystalline; the latter glass-like. The former melts and spreads at approximately 700° F., and the latter between 950 and 1000° F. The latter glass-like flux is preferred for brazing on iron and low-carbon steel.

The following table gives the preferred embodiments of the invention for use with different brazing ranges, and with different thicknesses of metal which are to be soldered:

| Brazing Range | Thickness of the Metal to be Soldered | Thickness of the High Melting Constituent | Weight Per cent of the Low Melting Constituent in the Composite Metal |
|---|---|---|---|
|  |  | *Inches* |  |
| Approx. 820° F | below 1/32 | .0005–.002 | 30–35 |
| Approx. 820° F | above 1/32 | .0005–.0025 | 30–35 |
| Approx. 920° F | below 1/32 | .0005–.0025 | 20–25 |
| Approx. 920° F | above 1/32 | .0005–.003 | 20–25 |
| Approx. 980° F | below 1/32 | .0005–.003 | 12–15 |
| Approx. 980° F | above 1/32 | .001–.004 | 12–15 |
| Approx. 1040° F | below 1/32 | .001–.004 | 8–10 |
| Approx. 1040° F | above 1/32 | .001–.005 | 8–10 |

The lower melting point constituent constitutes not substantially more than one-half by weight of the composite metal solder.

The thickness given for the high-melting constituent is the thickness for each individual portion thereof.

In view of the above, it will be seen that the several objects of the invention are achieved and other advantageous results attained.

As many changes could be made in the above methods and constructions without departing from the scope of the invention, it is intended that all matter contained in the above description or shown in the accompanying drawing shall be interpreted as illustrative and not in a limiting sense.

I claim:

1. A composite metal solder composed of an alloy of silver, copper, zinc and cadmium, said alloy being not substantially thicker than .005 of an inch and consisting of particles embedded in tin, said tin comprising approximately 25% of the weight of the solder.

2. A composite metal solder composed of an alloy of silver, copper, zinc and cadmium, said alloy being not substantially thicker than .005 of an inch and consisting of particles embedded in tin, said tin comprising approximately 19–21% by weight of the solder.

3. A composite metal solder composed of a plurality of separate metal constituents, one constituent being selected from the group consisting of silver, and alloys of silver containing: zinc approximately 5–25%, cadmium approximately 5-25%, copper not substantially in excess of 30%, and tin not substantially in excess of 10%, said constituent being not substantially thicker than .005 of an inch; and another of said constituents being selected from the group consisting of tin, cadmium, and alloys thereof containing: antimony not substantially in excess of 15%, lead not substantially in excess of 10%, bismuth not substantially in excess of 10%, and zinc not substantially in excess of 50%, said alloys containing not substantially less than 50% of at least one metal selected from the group consisting of tin and cadmium; said first-named constituent consisting of particles embedded in at least one other constituent; said first-named constituent constituting not substantially less than ½ by weight of the solder.

4. A composite metal solder in tube form composed of a plurality of separate metal constituents, one constituent being selected from the group consisting of silver, and alloys of silver containing: zinc approximately 5-25%, cadmium approximately 5-25%, copper not substantially in excess of 30%, and tin not substantially in excess of 10%, said constituent being not substantially thicker than .005 of an inch; and another of said constituents being selected from the group consisting of tin, cadmium, and alloys thereof containing: antimony not substantially in excess of 15%, lead not substantially in excess of 10%, bismuth not substantially in excess of 10%, and zinc not substantially in excess of 50%, said alloy containing not substantially less than 50% of at least one metal selected from the group consisting of tin and cadmium; said first-named constituent consisting of particles embedded in at least one other constituent; said first-named constituent constituting not substantially less than ½ by weight of the solder.

5. A composite metal solder in rod form composed of a plurality of separate metal constituents, one constituent being selected from the group consisting of silver, and alloys of silver containing: zinc approximately 5-25%, cadmium approximately 5-25%, copper not substantially in excess of 30%, and tin not substantially in excess of 10%, said constituent being not substantially thicker than .005 of an inch; and another of said constituents being selected from the group consisting of tin, cadmium, and alloys thereof containing: antimony not substantially in excess of 15%, lead not substantially in excess of 10%, bismuth not substantially in excess of 10%, and zinc not substantially in excess of 50%, said alloy containing not substantially less than 50% of at least one metal selected from the group consisting of tin and cadmium; said first-named constituent consisting of particles embedded in at least one other constituent; said first-named constituent constituting not substantially less than ½ by weight of the solder.

6. A composite metal solder composed of a plurality of separate metal constituents, one constituent being in wire form and being selected from the group consisting of silver, and alloys of silver containing: zinc approximately 5-25%, cadmium approximately 5-25%, copper not substantially in excess of 30%, and tin not substantially in excess of 10%, said constituent being not substantially thicker than .005 of an inch; and another of said constituents being selected from the group consisting of tin, cadmium, and alloys thereof containing: antimony not substantially in excess of 15%, lead not substantially in excess of 10%, bismuth not substantially in excess of 10%, and zinc not substantially in excess of 50%, said alloy containing not substantially less than 50% of at least one metal selected from the group consisting of tin and cadmium; said first-named constituent consisting of particles embedded in at least one other constituent; said first-named constituent constituting not substantially less than ½ by weight of the solder.

7. A composite metal solder composed of a plurality of separate metal constituents, one constituent being in foil form and being selected from the group consisting of silver, and alloys of silver containing: zinc approximately 5-25%, cadmium approximately 5-25%, copper not substantially in excess of 30%, and tin not substantially in excess of 10%, said constituent being not substantially thicker than .005 of an inch; and another of said constituents being selected from the group consisting of tin, cadmium, and alloys thereof containing: antimony not substantially in excess of 15%, lead not substantially in excess of 10%, bismuth not substantially in excess of 10%, and zinc not substantially in excess of 50%, said alloy containing not substantially less than 50% of at least one metal selected from the group consisting of tin and cadmium; said first-named constituent consisting of particles embedded in at least one other constituent; said first-named constituent constituting not substantially less than ½ by weight of the solder.

8. The method of forming a composite metal solder which comprises forming a solder composed of a plurality of separate metal constituents, one constituent being selected from the group consisting of silver, and alloys of silver containing: zinc approximately 5-25%, cadmium approximately 5-25%, copper not substantially in excess of 30%, and tin not substantially in excess of 10%, said constituent being not substantially thicker than .005 of an inch; and another of said constituents being selected from the group consisting of tin, cadmium, and alloys thereof containing; antimony not substantially in excess of 15%, lead not substantially in excess of 10%, bismuth not substantially in excess of 10% and zinc not substantially in excess of 50%, said alloys containing not substantially less than 50% of at least one metal selected from the group consisting of tin and cadmium; said first-named constituent constituting not substantially less than ½ by weight of the solder; by coating particles of one of said constituents of sufficient size not to be dissolved thereby with another of said constituents and adjusting the thickness of the silver constituent to not more than approximately .005 of an inch.

GEORGE DURST.

REFERENCES CITED

The following references are of record in the file of this patent:

UNITED STATES PATENTS

| Number | Name | Date |
| --- | --- | --- |
| 616,613 | Griffith | Dec. 27, 1898 |
| 2,334,609 | Cox | Nov. 16, 1943 |
| 1,291,878 | Hess | June 21, 1919 |